United States Patent [19]

Shimada et al.

[11] Patent Number: 5,189,415
[45] Date of Patent: Feb. 23, 1993

[54] RECEIVING APPARATUS

[75] Inventors: Takashi Shimada; Satoru Inoue; Takaaki Maekawa; Akio Jitsumori, all of Hyogo, Japan

[73] Assignee: Japan National Oil Corporation, Tokyo, Japan

[21] Appl. No.: 775,760

[22] Filed: Oct. 15, 1991

[30] Foreign Application Priority Data

Nov. 9, 1990 [JP] Japan .................................. 2-305219
Nov. 9, 1990 [JP] Japan .................................. 2-305221

[51] Int. Cl.$^5$ ............................................. G01V 1/00
[52] U.S. Cl. .............................. 340/854.6; 340/854.8; 175/40; 166/250
[58] Field of Search .................. 340/854.6, 854.8; 175/40, 50; 166/250, 66; 73/151

[56] References Cited

U.S. PATENT DOCUMENTS

2,414,719 1/1947 Cloud ................................ 340/854.6
4,578,675 3/1986 MacLeod ............................ 340/855

Primary Examiner—J. Woodrow Eldred
Attorney, Agent, or Firm—Rothwell, Figg, Ernst & Kurz

[57] ABSTRACT

A receiving apparatus for receiving information transmitted from a bottomhole to a surface by means of electromagnetic waves. The receiving apparatus includes a receiving antenna for receiving a transmitted signal from the bottomhole, a noise detector for detecting noise current received by the receiving antenna, and a noise canceller for removing noise components received by the receiving antenna by comparing an output signal from the receiving antenna and an output signal of the noise detector. The noise canceller is a noise canceller using parallel adaptive filters, and includes a plurality of adaptive filters arranged in parallel fashion, an adder for summing output signals of the plurality of adaptive filters, and a subtracter for subtracting an output signal of the adder from a main input signal.

13 Claims, 10 Drawing Sheets

RECEIVING APPARATUS

BACKGROUND OF THE INVENTION

1. Field of the Invention

The present invention relates to a receiving apparatus that can improve the S/N ratio of a receiving signal and a receiving antenna for an ultra long wavelength electromagnetic wave used for transmitting downhole information onto the ground in the case of drilling oil wells or gas wells.

2. Description of the Prior Art

When drilling an oil well or a gas well, it is essential to obtain downhole information on geological characteristics such as downhole temperature, downhole pressure and so on. There are several conventional methods to measure such information. One method is to measure by placing a well logging instrument into the ground from the top of the drilled well after having lifted a drill pipe on the ground. Another method is to measure components of drilling fluid called "mud" which is circulated via a drill pipe between the downhole and the surface during the drilling, which method is called mud logging method.

However, it takes a long time for measuring downhole information by these methods, and hence, real time measurement of the downhole information is impossible. For this reason, measuring technique aiming at the real time measurement, which is called MWD (Measurement While Drilling), has been studied recently, and various methods are proposed. Above all, a technique employing an electromagnetic wave has been attracting attention.

Figure 1:
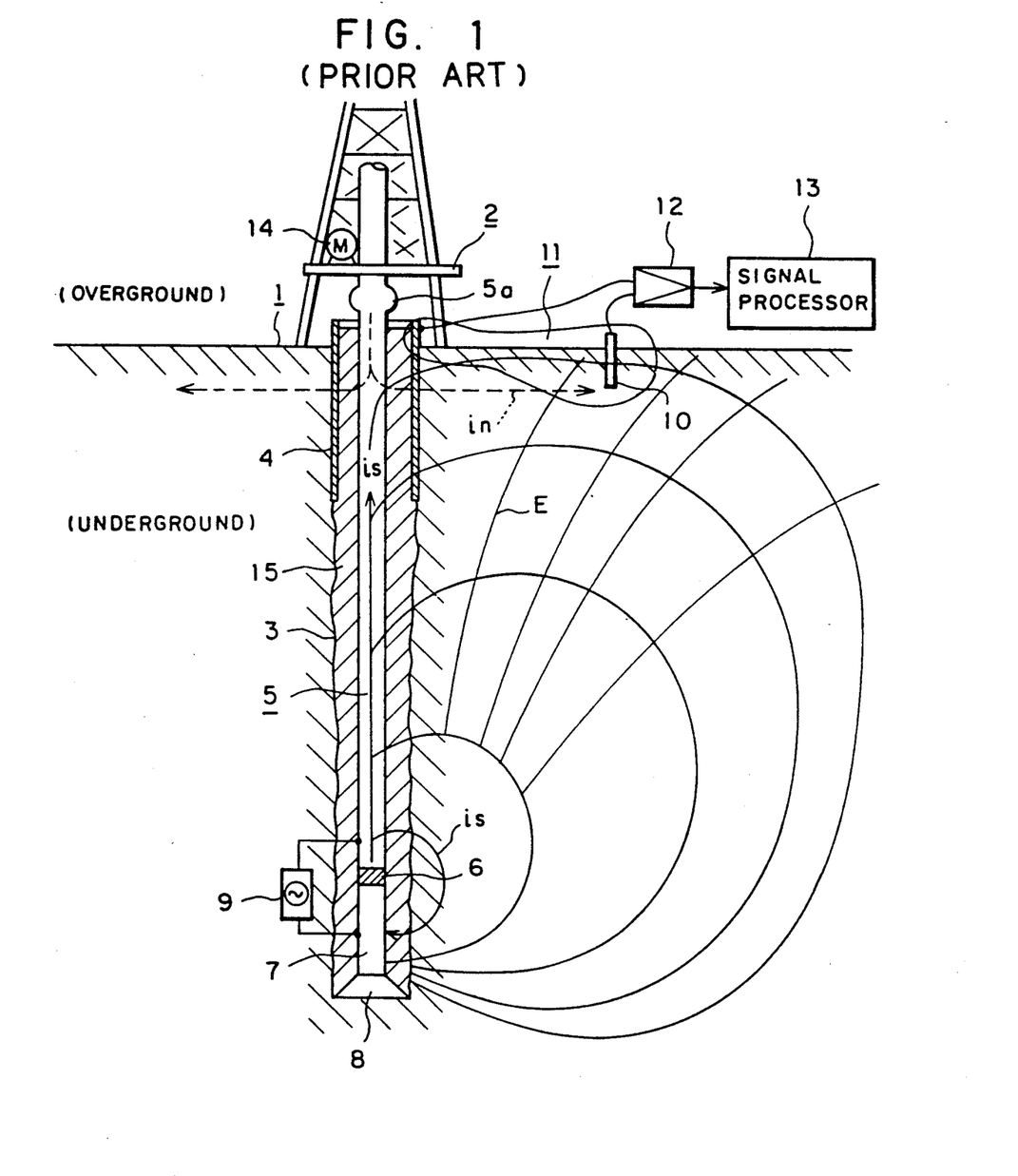
FIG. 1 is a block diagram showing an arrangement of a conventional receiving apparatus.

For example, FIG. 1 shows an arrangement of a conventional receiving apparatus disclosed by a U.S. reference "Status report: MWD Technology" in PETROLEUM ENGINEER International, OCTOBER, 1988. In this figure, a drilling rig 2 is built on the ground 1. Immediately under the drilling rig 2, an oil well 3 is formed by drilling. Near the top of the oil well 3, there is provided a casing pipe 4 made of steel so as to prevent the wall of the oil well from collapsing. In addition, a drill pipe 5 extends in and projects out of the casing pipe 4. To the tip of the drill pipe 5, a drill collar 7 is attached via an insulating collar 6. At the top of the drill pipe 5, there is provide a blow out preventer 5a on the ground. At the tip of the drill collar 7, a bit 8 for drilling is joined. Thus, by rotating the drill pipe 5 with a motor 14 via chains or gears, the ground 1 is drilled. In the drill collar 7, a transmitting apparatus 9 is incorporated to transmit downhole information onto the ground. The transmitting apparatus detects temperature, pressure, or the like of the downhole, converts them into electric signals, and sends the information in the form of modulated signals. Transmitting output terminals of the transmitting apparatus 9 are connected to the drill pipe 5 and the drill collar 7, respectively, which are interconnected via the insulating collar 6. Thus, the drill pipe 5 and the drill collar 7 serve as a transmitting dipole antenna for sending a modulated ultra long wavelength electromagnetic wave onto the ground.

On the other hand, at the proximal portion of the drilling rig 2, there is provided a dipole type receiving antenna 11 for detecting the ultra long wavelength electromagnetic wave transmitted from the downhole. One terminal of the receiving antenna 11 is led out of the casing pipe 4, and the other terminal thereof is composed of an electrode 10 buried in the ground. Thus, the ultra long wavelength electromagnetic wave is received by the antenna. A signal received by the receiving antenna 11 is inputted to an amplifier 12, and the amplified signal is inputted to a signal processor 13 in order to obtain downhole information by decoding the signal. As an ultra long wavelength electromagnetic wave, a wave whose frequency is on the order of tens of hertz is used depending on stratum, geology and depth.

A current $i_s$ flows through the drill pipe 5 and the ground when an electromagnetic wave is sent into the ground by the transmitter 9, as shown by solid lines in this figure. Here, E represents equipotential lines formed by the current $i_s$. The receiving antenna 11 detects the difference of the potential. The detected signal is amplified by the amplifier 12, and is recognized by the signal processor 13 as downhole information.

Figure 2:
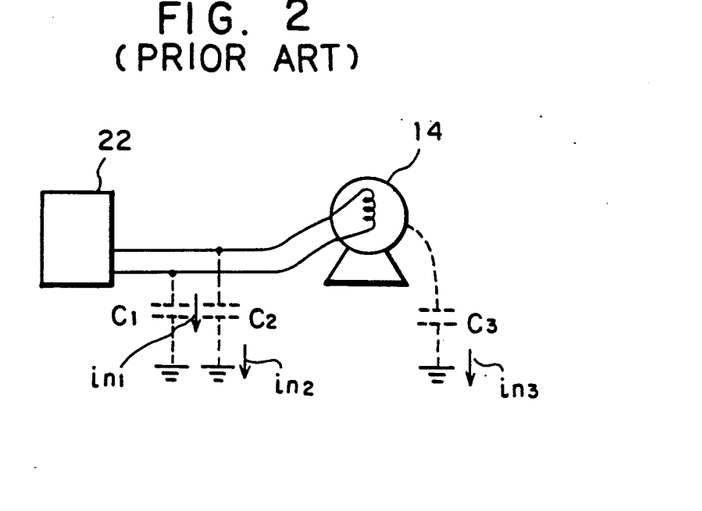
FIG. 2 is a diagram for explaining passages of a ground current (noise current) flowing from a driving circuit 22 and lead wires of a motor 14 to the ground via stray capacitances.

The drill pipe 5 is directly rotated by the motor 14 so that the drilling rig 2 rotates the bit 8 to drill. When the motor 14 rotates, ground currents $in_1$, $in_2$ and $in_3$ flow through stray capacitances $C_1$, $C_2$ and $C_3$ between lead lines and the ground as shown in FIG. 2, or between windings of the motor 14 and the drilling rig 2. The ground currents flow into the ground 1 through the drill pipe 5, muddy water 15 indicated by oblique lines in FIG. 6, and the casing pipe 4, as shown by broken lines $i_n$ in FIG. 1. Thus, the currents interfere with the transmission signal $i_s$, and decrease the S/N ratio of the transmission signal $i_s$. The current $i_n$ is called a noise current.

Since the conventional receiving apparatus is arranged as described above, ground currents flow out when the electric machines (especially the motor) installed on the floor of the drilling rig are in operation. The currents interfere with a signal received by the antenna via the ground so that the S/N of the received signal from the ground decreases. This presents problems that information transmission from deep locations is hindered, and that the reliability of the information reduces.

On the other hand, as a noise canceller for canceling noises mixed with an input signal to such a receiving apparatus, a noise canceller using an adaptive filter is known.

Figure 3:
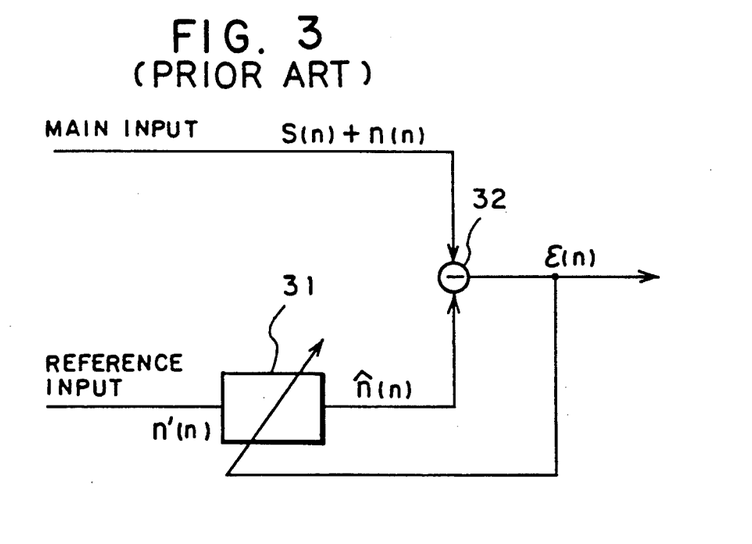
FIG. 3 is a block diagram showing a conventional noise canceller using an adaptive filter.

FIG. 3 is a block diagram showing a conventional noise canceller using a parallel adaptive filter disclosed by B. Widrow et al., in "adaptive filters and neural networks for adaptive pattern recognition", in Nikkei Electronics, 1988, 9, 5 (No. 455), pp. 201-218. In this figure, reference numeral 31 denotes an adaptive filter, and reference numeral 32 designates a subtracter. The adaptive filter 31 receives, as a reference signal, a noise source signal n'(n) that has large correlation with a noise n(n) entering a main input signal S(n), adjusts the filtering characteristic of itself on the basis of an output signal ε(n) of the subtracter 32 so that the noise n(n) mixed with the main input signal S(n) is canceled, and supplies the subtracter 32 with a signal ñ(n). The subtracter 32 subtracts the output signal ñ(n) of the adaptive filter 31 from the main input signal S(n)+n(n) which includes the noise n(n).

Next, the operation is explained.

As a main input to the noise canceller, a signal S(n) with which a noise n(n) is mixed is inputted to the subtracter 32. In addition, a noise source signal n'(n) having strong correlation with the noise n(n) is inputted to the adaptive filter 31 as a reference signal. The adaptive filter 31, adjusting its filtering characteristics as explained later, converts the noise source signal n'(n) into ñ(n), which is subtracted by the subtracter 32 from the main input signal S(n)+n(n) which includes the noise n(n). The adaptive filter 31 adjusts its filtering frequency characteristics so that a mean square $<\epsilon^2(n)>$ becomes minimum on the basis of a subtraction result $\epsilon(n)$ of the subtracter 32. As a result, the input-output relation of the adaptive filter 31 is continually adjusted in such a manner that the filter outputs an optimum estimate waveform ñ(n) equal to the noise n(n) mixed with the main input signal S(n) when the noise source signal n'(n) is inputted as the reference signal. The filtering characteristics are adjusted in accordance with the following algorithm.

The result $\epsilon(n)$ of the subtraction can be expressed by the following equation:

$$\epsilon(n) = S(n) + n(n) - \hat{n}(n)$$

In this case, the mean square of the subtraction becomes, $$<\epsilon^2(n)> \ = \ <[S(n) + n(n) - \hat{n}(n)]^2> \\ = \ <S^2(n)> + <S(n)\{n(n) - \hat{n}(n)\}> + \\ <\{n(n) - \hat{n}(n)\}^2> \quad (1)$$

Generally, a signal and a noise have no correlation, and hence, the following approximation holds:

$$<S(n)\{n(n)-\hat{n}(n)\}> = 0$$

Thus, equation (1) can be rewritten as $$<\epsilon^2(n)> = <S^2(n)> + <\{n(n)-\hat{n}(n)\}^2> \quad (2)$$

Equation (2) shows that varying n'(n) so that the square means $<\epsilon(n)>$ takes a minimum value does no effect on the square mean of the signal. In addition, when $<\epsilon^2(n)>$ is minimum, $<\{n(n)-\hat{n}(n)\}^2>$ is minimum, and ñ(n) becomes an optimum approximation of n(n). As a result, $\epsilon(n)$ becomes an approximation of S(n).

A conventional noise canceller using an adaptive filter is arranged as described above, and cancels noises with reference to a single noise source signal. As a result, when noises generated by a plurality of noise sources enter a signal, sufficient noise cancelling cannot be achieved, resulting in increase in residual noises.

SUMMARY OF THE INVENTION

An object of the present invention is to eliminate the above problems. It may be possible to solve these problems by increasing transmission power of the transmitting apparatus. Increasing the transmission power, however, is practically impossible because this makes dimensions of the transmitting apparatus larger, which hinders the apparatus from being installed into the drill pipe. For this reason, the present invention accomplishes the object by improving the S/N of a received signal to enhance the reliability of ground information.

Another object of the present invention is to eliminate the above problems by offering a receiving apparatus comprising a noise canceller using adaptive filters that can achieve sufficient noise cancelling and residual noise reduction even when noises generated by a plurality of noise sources are mixed with a signal.

According to one aspect of the present invention, there is provided a receiving apparatus for receiving information transmitted from a bottomhole to a surface by means of electromagnetic waves, which comprises: a receiving antenna for receiving a transmitted signal from said bottomhole; a noise detector for detecting noise current received by said receiving antenna; and a noise canceller for removing noise components received by said receiving antenna by comparing an output signal from said receiving antenna and an output signal of said noise detector.

Here, the noise canceller may be a noise canceller using parallel adaptive filters comprising: a plurality of adaptive filters arranged in parallel fashion; an adder for summing output signals of said plurality of adaptive filters; and a subtracter for subtracting an output signal of said adder from a main input signal.

According to a receiving apparatus of the present invention, noises entering the receiving antenna are detected by the noise current detector, and the noises interfering with a transmission signal are eliminated by using the detected signal. This makes it possible to obtain a high S/N transmission signal, thereby enabling a high reliable decoding of the transmission signal.

A noise canceller using parallel adaptive filters of the present invention includes a plurality of adaptive filters disposed in parallel fashion, and the adder for summing up output signals of the adaptive filters. Thus, noises generated by a plurality of noise sources are canceled, and remaining noises can be reduced.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Figure 4:
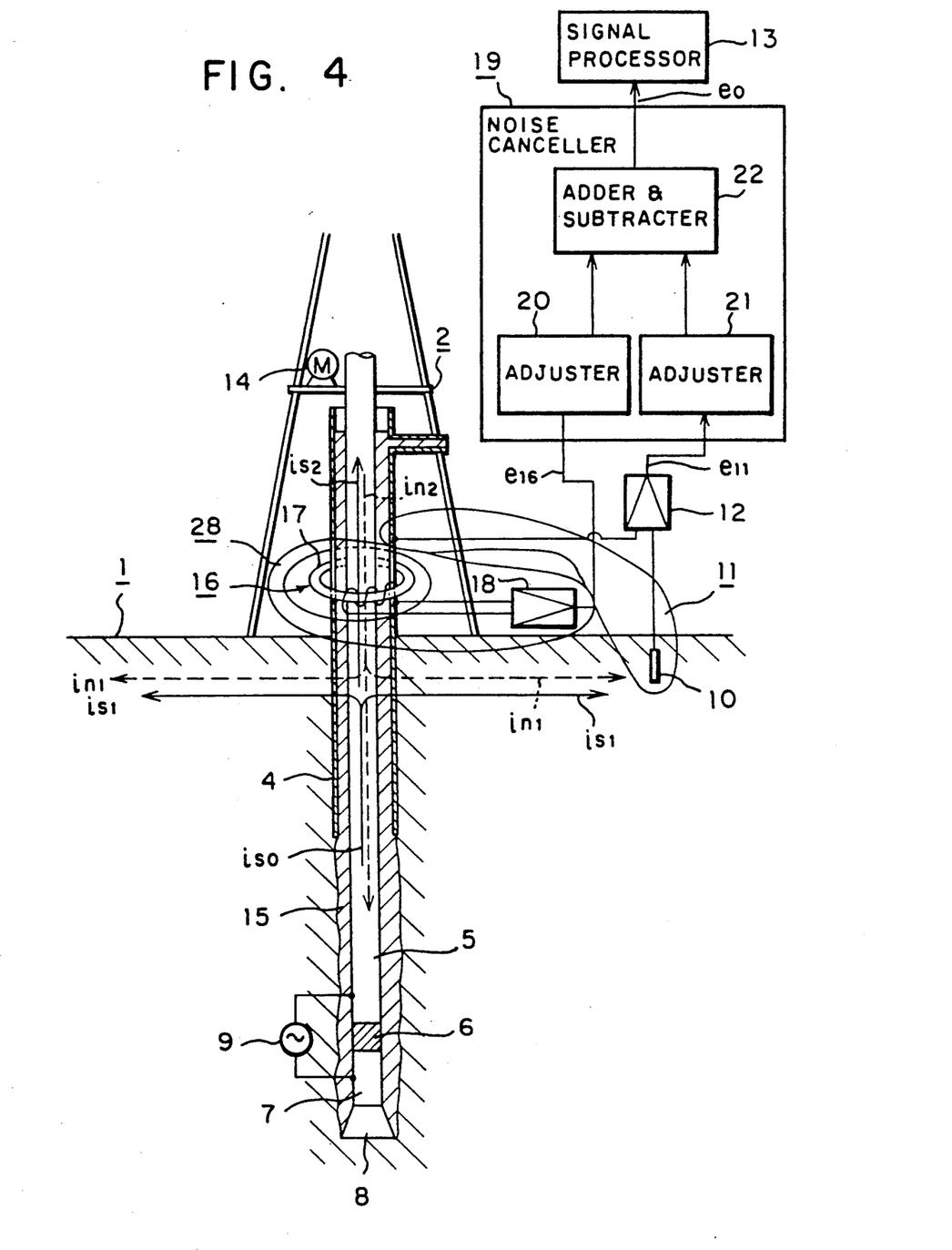
FIG. 4 is a block diagram showing an arrangement of an embodiment of a receiving apparatus according to the present invention.

Embodiments of the present invention will be described with reference to the drawings. FIG. 4 is a diagram showing an arrangement of an embodiment of a receiving apparatus according to the present invention. In this figure, the same reference numerals designate the same or corresponding portions as those of the conventional apparatus of FIG. 1, and so the description thereof will be omitted.

In this figure, reference numeral 16 designates a toroidal coil for detecting a current flowing through a casing pipe 4. Reference numeral 17 denotes a core on which the toroidal coil 16 is wound. Reference numeral 18 designates an amplifier for amplifying an output signal of the toroidal coil 16. Reference numeral 28 denotes a noise detector composed of the toroidal coil 17 and the amplifier 18. Reference numeral 20 denotes an adjuster for adjusting amplitude and phase characteristics of an output signal of the amplifier 18. Reference numeral 21 denotes an adjuster for adjusting amplitude and phase characteristics of an output signal of an amplifier 12. Reference numeral 22 designates an adder and subtracter for removing an output component of the adjuster 20 from an output of the adjuster 21. Reference numeral 19 denotes a noise canceller comprising the adjusters 20 and 21, and the adder and subtracter 22.

Next, the operation will be described. Here, a transmission method and operation of an electromagnetic wave, and a drilling method of a well by a drilling rig 2 are the same to those of the conventional technique, and so the description thereof will be omitted.

The subject matter of the present invention, i.e., a receiving antenna system and a noise eliminating method for cancelling effects of noises $i_n$ caused by the drilling rig 2 will be described here.

As described in the conventional operation, when receiving a transmission signal from a bottomhole during drilling, a part $i_{n1}$ of a noise current $i_{n2}$ caused by electric machines of the drilling rig 2 flows from a drill pipe 5 into the ground via a mud 15 and the casing pipe 4 as shown in FIG. 4. Then, the current $i_{n1}$ enters the receiving antenna 11.

On the other hand, a part $i_{s1}$ of the transmission signal $i_{s0}$ transmits the drill pipe 5 and the ground 1, and reaches the surface of the ground where the receiving antenna is placed. The remainder $i_{s2}$ of the signal $i_{s0}$ propagates the top portion of the drill pipe 5 which projects from the surface of the ground, and reaches a rig floor where a motor 14 is installed.

Here, assuming that the frequency of the transmission signal $i_{s0}$ is $f_0$, and that the frequency band of the noise current is $f_2 - f_1 = \Delta f$, the relationship of these frequencies can be expressed as follows:

$$f_1 < f_0 < f_2 \quad (3)$$

As shown, the frequency of the transmission signal is contained between the noise band $f_2 - f_1$. Accordingly, a conventional filter cannot eliminate the noises.

For this reason, the noise components of the transmission signal is detected by a method other than the receiving antenna 11 for receiving the transmission signal. The detected noise components are subtracted from the transmission signal, thus eliminating the noise components, and obtaining the transmission signal. The principle of this will be described below. To simplify explanation, signals are expressed as scalars.

In the surface of the ground, the transmission signal $i_{s1}$ and the noise current $i_{n1}$ flow in the same direction with regard to the receiving antenna. Hence, these signals $i_{s1}$ and $i_{n1}$ are in the same phase. Accordingly, the signal received by the receiving antenna 11, that is, the output of the amplifier 12 can be expressed as follows:

$$e_{11} = a_{11}(i_{s1} + i_{n1}) \quad (4)$$

where $a_{11}$ is a current-to-voltage conversion coefficient of the amplifier 12.

On the other hand, the currents $i_{s2}$ and $i_{n2}$ flowing through the drill pipe 5 flow in the opposite directions at the location where the toroidal coil 16 is disposed. Consequently, the current detected by the toroidal coil 16, that is, the output of the amplifier 18 can be expressed as the following equation.

$$e_{16} = a_{16}(i_{s2} - i_{n2}) \quad (5)$$

where $a_{16}$ is a current-to-voltage conversion coefficient of the amplifier 18. The amplitudes of the noise currents $i_{n1}$ and $i_{n2}$ are adjusted by the adjusters 20 and 21 so that the following relation is satisfied:

$$k \cdot i_{n1} = i_{n2} \quad (6)$$

Then, the output of the adder and subtracter 22 can be expressed as follows:

$$e_0 = e_{11} + e_{16} \quad (7)$$

$$e = k \cdot a_{11}(i_{s1} + i_{n1}) + a_{16}(i_{s2} - i_{n2}) \quad (8)$$

$$e_0 = k \cdot a_{11} \cdot i_{s1} + a_{16} \cdot i_{s2} \quad (9)$$

Equation (9) is derived from equation (6) ($k \cdot i_{n1} = i_{n2}$) and $a_{11} = a_{16}$, and shows that the components of the noise current $i_n$ are removed from the output of the adder and subtracter 22. The noise cancelling makes it possible to improve the S/N of the transmission signal, thereby increasing the reliability of decoding of the decoder 13.

Figure 5:
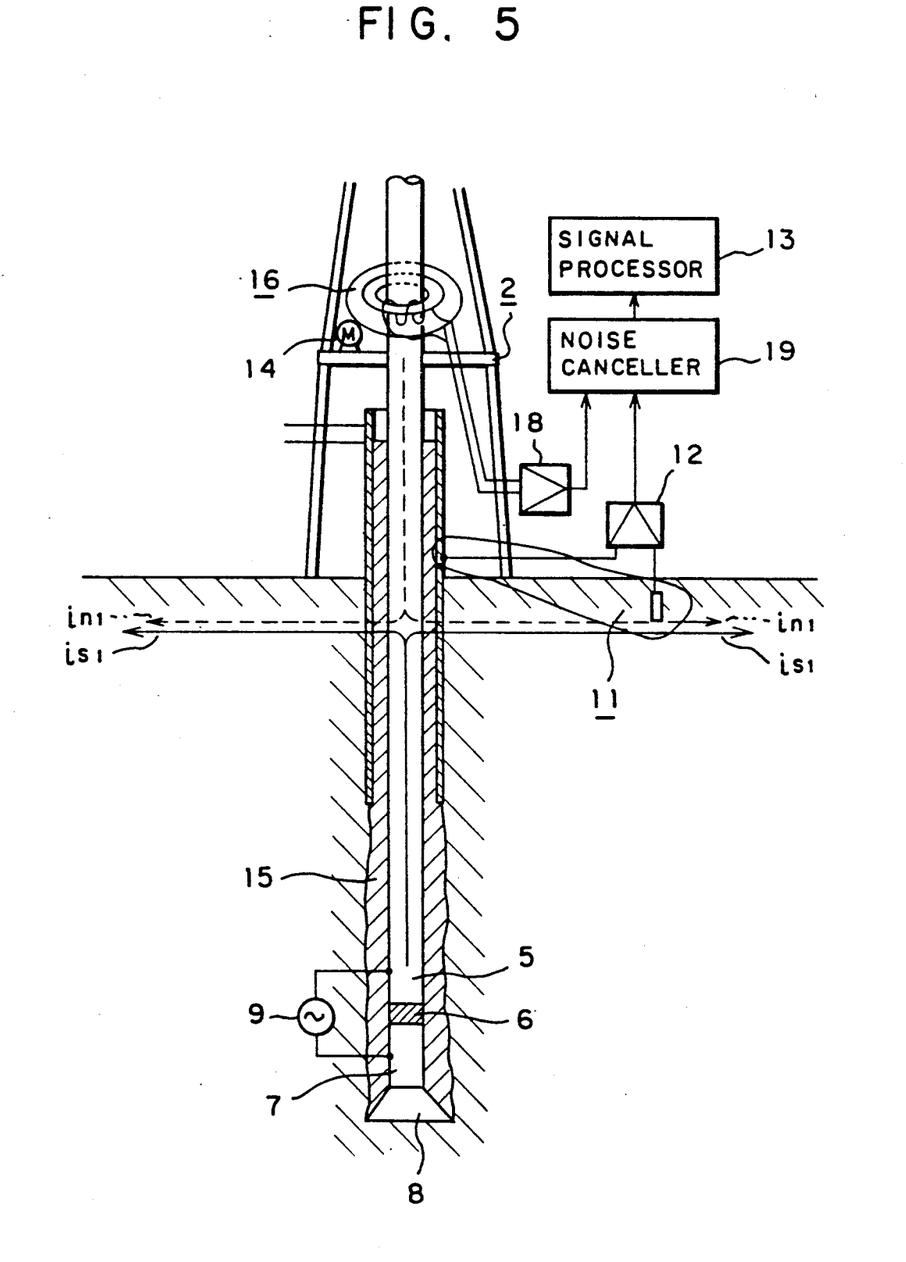
FIGS. 5, 6, 7, and 8 are block diagrams showing arrangements of other embodiments of receiving apparatuses according to the present invention.

Incidentally, although the toroidal coil 16 is disposed at a wellhead of the well under the drilling rig in this embodiment, it may be disposed at other places. For example, the toroidal coil 16 may be placed on the rig floor where the motor 14 is installed as shown in FIG. 5 so that the noise current flowing through the drill pipe 5 is detected.

Figure 6:
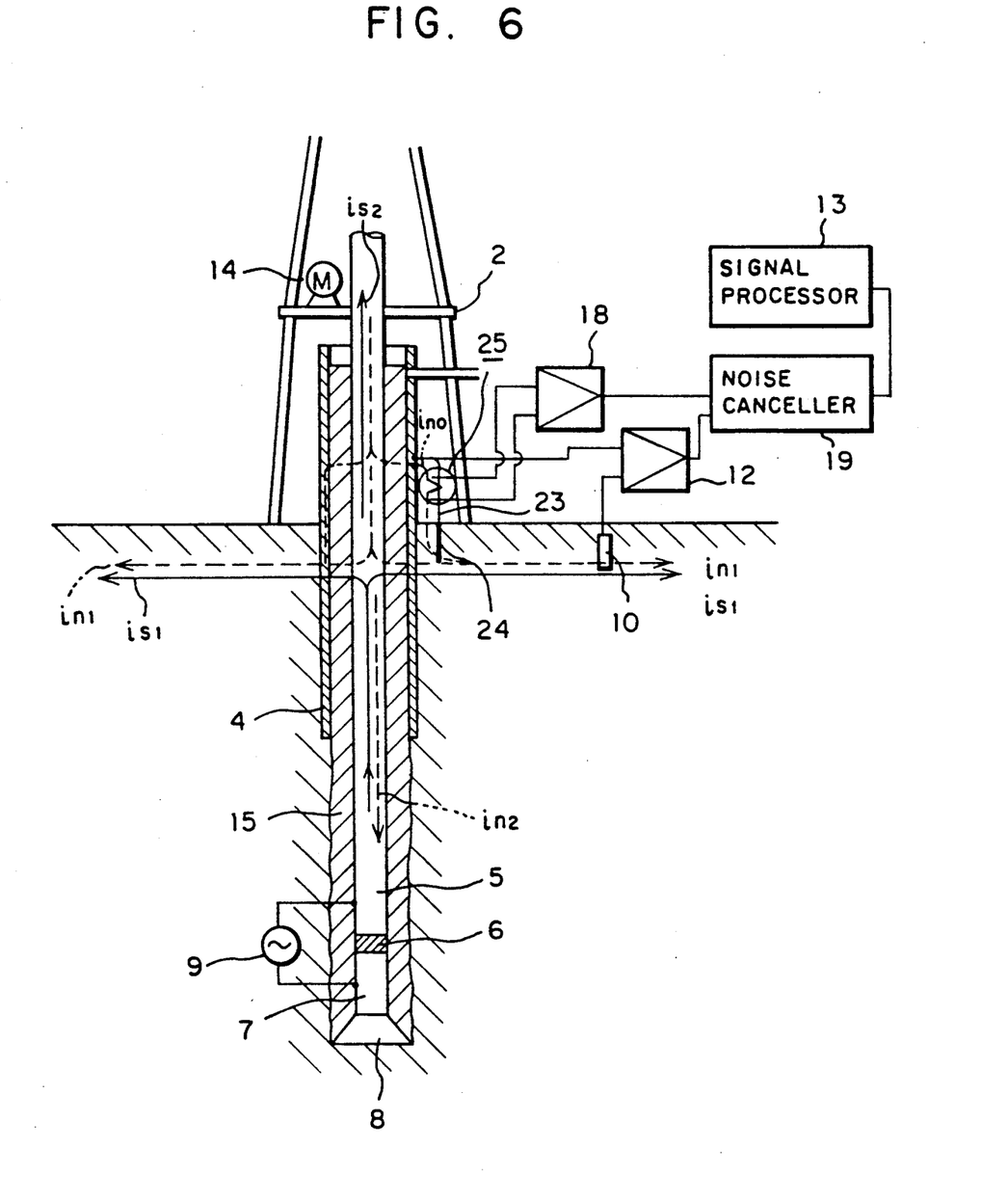

Furthermore, as shown in FIG. 6, a branch current $i_{n0}$ of the current flowing through the casing pipe 4 may be detected by connecting a lead wire 23 to the casing pipe 4, by burying a ground rod 24 into the ground, and by attaching a current probe (current transformer) 25 to the lead wire 23. Noise cancelling processing similar to that of the above embodiment can eliminate noises.

Figure 7:
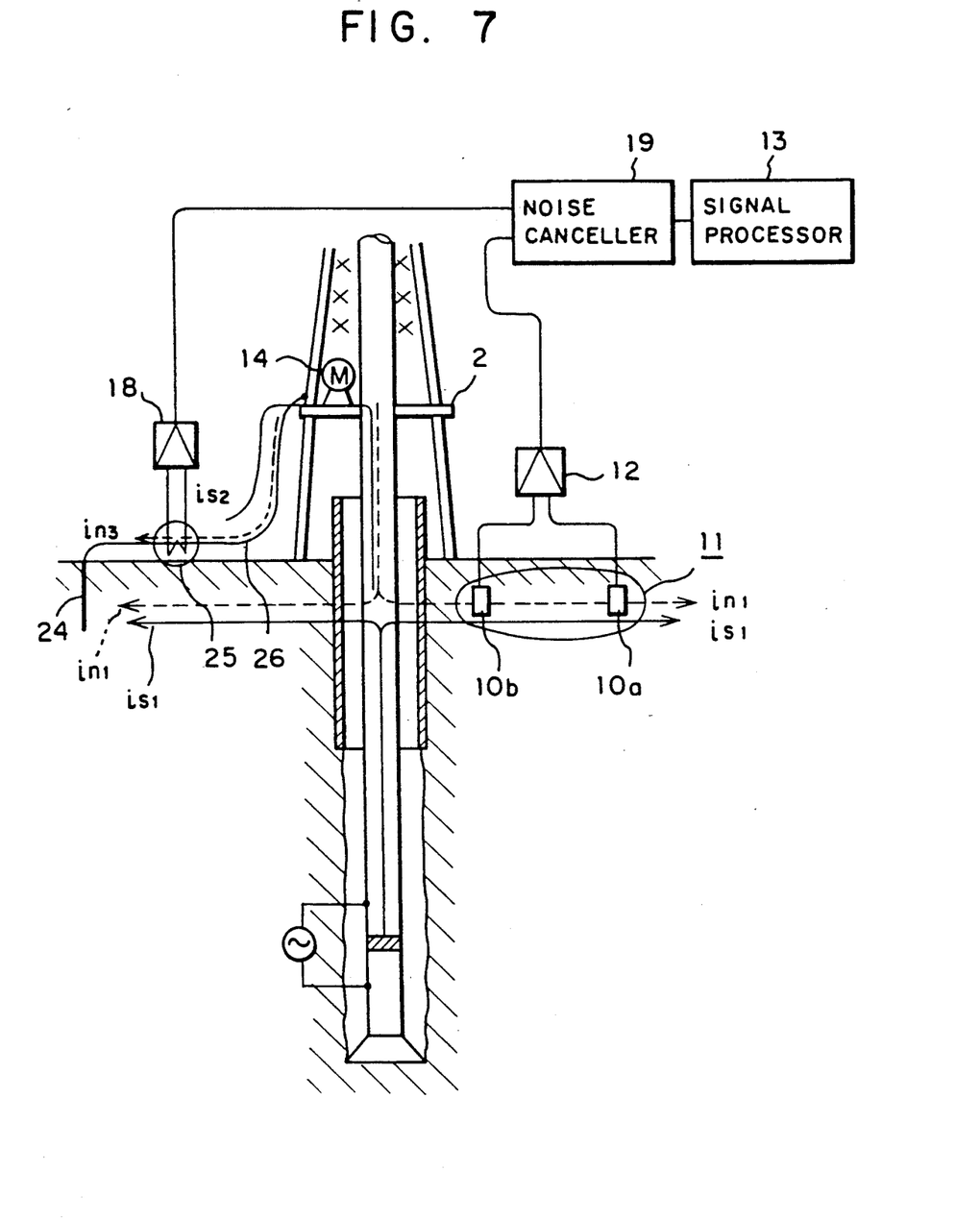

Moreover, as shown in FIG. 7, a noise current for noise cancelling can be detected by measuring a current $i_{n3}$ flowing through a ground line 26 for preventing electric shock of the drilling rig 2 instead of measuring the current flowing through the lead wire 23.

In addition, a signal for noise cancelling can be obtained by measuring a fluctuation of a load current of the motor as a noise source, or a fluctuation of an output current of a generator by using the current probe 25, or by adding the entire current signals.

Still further, although in the embodiment, the adjusters 20 and 21 of the noise canceller 19 have only a level adjusting function of the input signals $e_{11}$ and $1_{16}$, they can have a phase adjusting function to cancel the phase difference of the two input signals.

Finally, two waveforms outputted from the adjusters 20 and 21 lose their real time correlation when the transmission characteristics of the two signals detected by the receiving antenna 11 and the toroidal coil 16 differ each other. Accordingly, the level and phase adjustment functions are not enough to cancel noises. In such a case, similar effects can be accomplished by the following methods: First, the output signals of the adjusters 20 and 21 are passed through filters so that they are subjected to band limiting, and then the difference of the two is obtained. Second, matching of the transmission characteristics of the two signals $e_{11}$ and $1_{16}$ is implemented by using an adaptive filter 27 as shown in FIG. 8 so as to eliminate noises.

In the above description, the noise current for canceling noises are obtained by detecting a current flowing through the drill pipe, or a current flowing through the ground line for preventing an electric shock. These currents flowing through the drill pipe or the ground line, however, sometimes include different noise components. Furthermore, noise currents including other noise components can be detected in some cases. In such cases, it is not enough to cancel noises by referring to only one noise current, because this method cannot cancel a plurality of noise components, and hence, only insufficient effect for reducing residual noises can be achieved.

To solve this, a noise canceller using parallel adaptive filters, which comprises a plurality of adaptive filters arranged in parallel fashion so as to cancel diverse noise components by using a plurality of reference noises.

Figure 8:
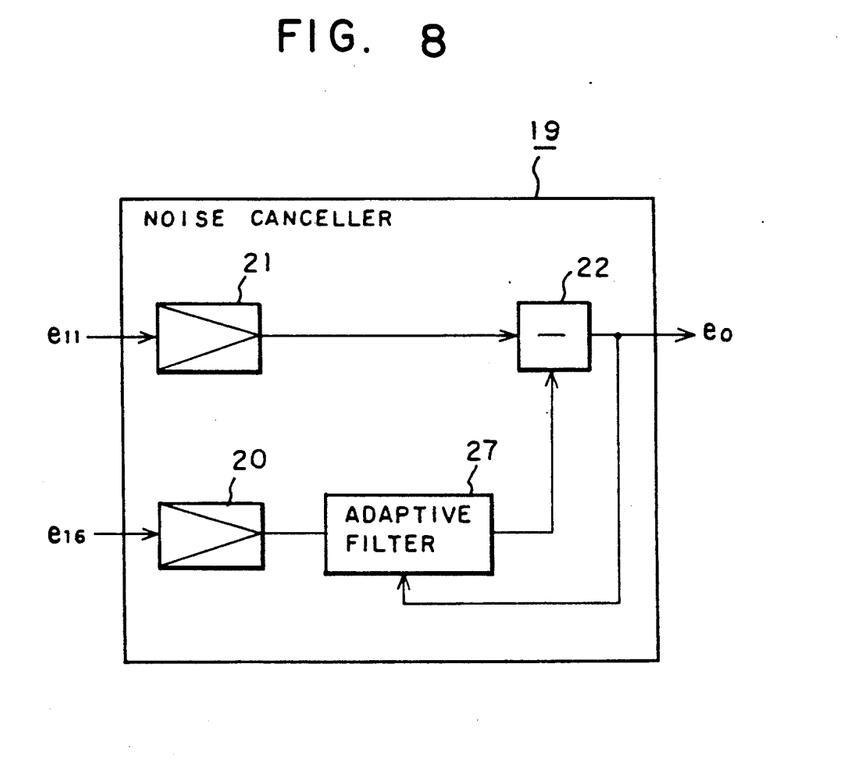
Figure 9:
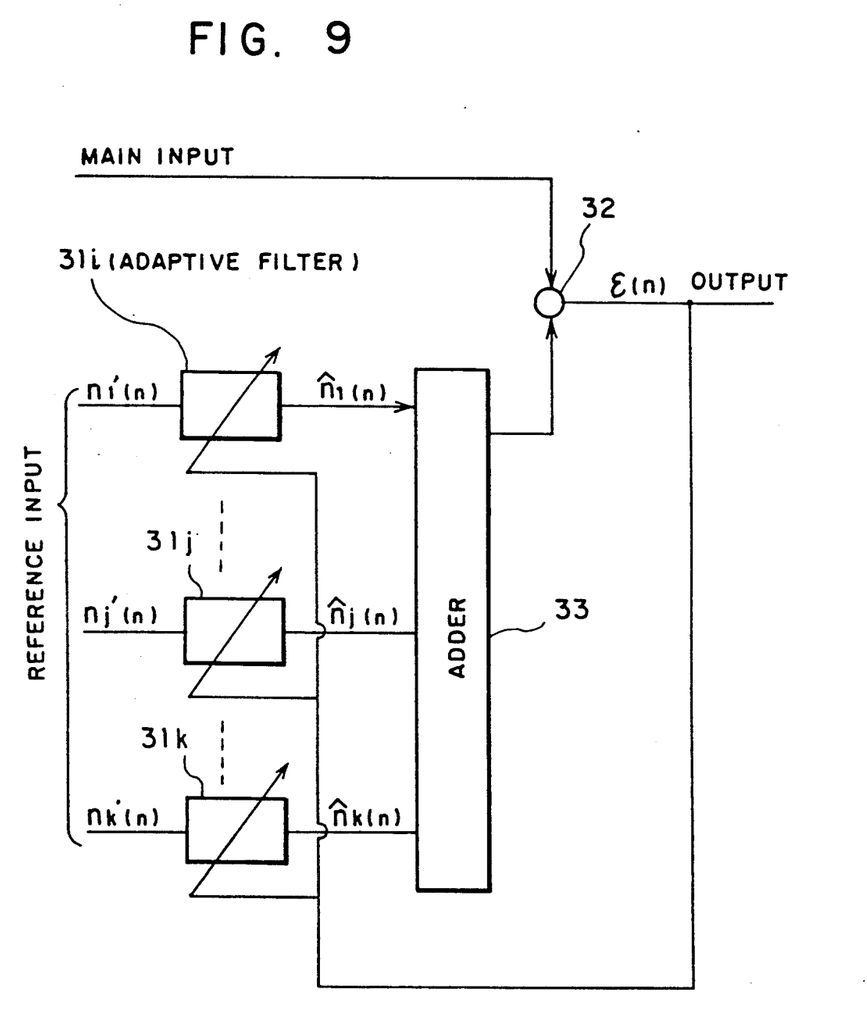
FIG. 9 is a block diagram showing an embodiment of a noise canceller using parallel adaptive filters according to the present invention.
Figure 10:
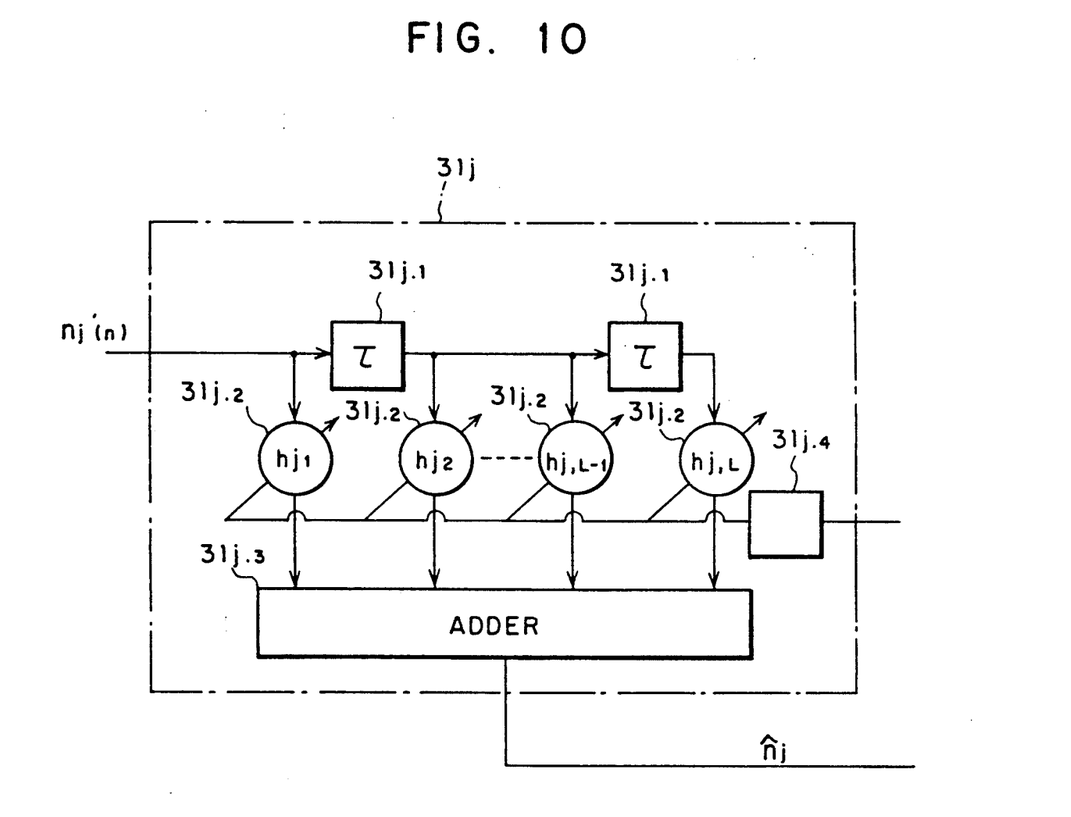
FIG. 10 is a block diagram illustrating an arrangement of a noise canceller using FIR type adaptive filters as adaptive filters.

FIG. 9 is an embodiment of a noise canceller using parallel adaptive filters, as an example of the noise canceller shown in FIG. 8. In FIG. 9, reference numerals $31_j$ (j=1, 2, ... k) designate adaptive filters, reference numeral 32 denotes a subtracter, and reference numeral 33 designates an adder. FIG. 10 is a block diagram when an FIR (Finite Impulse Response) type adaptive filters are used as adaptive filters $1_j$. In this figure, reference numerals $31_{j,1}$ denote l−1 delay circuits having a predetermined delay time t, reference numerals $31_{j,2}$ denote multipliers each multiplying its input by a variable coefficient $h_{j,m}(n)$ (m=1, 2, ... k), reference numeral $31_{j,3}$ denotes an adder summing up the outputs of all the multipliers $31_{j,2}$, and reference numeral $31_{j,4}$ designates a coefficient controller for controlling the variable coefficients.

Next, the operation will be explained with reference to FIG. 9.

Let us assume that a main input signal is expressed as S(n), that noises entering the main input signal S(n) are expressed as $n_j(n)$ (j=1, 2, ... k), and that reference inputs are noise source signals $n'_j(n)$ having strong correlation with the noises $n_j(n)$ mixed with the main input signal S(n). Each of the reference inputs is fed to each one of the adaptive filters $31_j$, and the output signals of the adaptive filters $31_j$ are summed up by the adder 33. Subsequently, the total sum outputted from the adder 33 is subtracted by the subtracter 32 from the main input signal with which the noises are mixed.

The adaptive filters $31_j$ obtain a mean square $<\epsilon^2(n)>$ on the basis of the subtraction result $\epsilon(n)$, and adjust the filtering characteristics to minimize the mean square. As a result, when the noise source signals $n'_j(n)$ are inputted as reference signals, the adaptive filters $31_j$ become to output approximate waveforms $\hat{n}_j(n)$ (j=1, ... k) of the noises $n_j(n)$ mixed with the main input signal. Thus, the noises $n_j(n)$ mixed with the main input signal is canceled by the approximate waveforms $\hat{n}_j(n)$ so that a subtraction result $\epsilon(n)$ approaches the signal S(n).

The characteristics of the adaptive filters are adjusted in accordance with the following algorithm.

First, the subtraction result $\epsilon(n)$ can be expressed by the following equation:

$$\epsilon(n) = S(n) + n_1(n) + \ldots + n_k(n) - \hat{n}_1(n) - \ldots - \hat{n}_k(k)$$

The mean square of the subtraction result is as follows:

$$<\epsilon^2(n)> = <[S(n)+n_1(n)+\ldots+n_k(n) -\hat{n}_1(n)-\ldots -\hat{n}_k(n)]^2> \quad (10)$$

Here, since the main input signal and the noises have no correlation, and the noises themselves have no correlation, the following approximation is obtained.

$$<S(n)\cdot n_j(n)>(j=1,\ldots k)=0$$

$$<n_i(n)\cdot n_j(n)>(i=1,\ldots k, l=1,\ldots k, i\neq l)=0$$

$$<n_i(n)\cdot \hat{n}_j(n)>(i=1,\ldots k, l=1,\ldots k, i\neq l)=0$$

From these approximations, equation (3) can be approximated as follows:

$$<\epsilon^2(n)> = <S^2(n)> + <\{n_1(n)-\hat{n}_1(n)\}^2> + \ldots + <\{n_k(n)-\hat{n}_k(n)\}^2> \quad (11)$$

Equation (11) shows that even when $\hat{n}_j(n) <j=1, \ldots k>$ are varied so that the mean square $<\epsilon^2(n)>$ becomes minimum, the mean square of the signal is not affected In addition, when the mean square $<\epsilon^2(n)>$ is a minimum, the second and the following terms of the right-hand side of equation (11), that is, the terms $$<\{n_1(n)-\hat{n}_1(n)\}^2> + \ldots + <\{n_k(n)-\hat{n}_k(n)\}^2>$$

become minimum, and $\epsilon(n)$ becomes an optimal approximation of S(n).

Next, the operation of the adaptive filters will be described with reference to an arrangement using the FIR type adaptive filters shown in FIG. 10, as adaptive filters $31_j$.

Respective inputs to adaptive filters $31_j$ are sequentially delayed by a predetermined time $\tau$ by means of l−1 delay circuits $31_{j,l}$ connected in cascade. Subsequently, the delayed results are multiplied by the coefficients $h_{j,m}(n)$ (m=1, ... l), and the sum total of these are obtained by the adder $31_{j,3}$. Accordingly, when $n'_j(n)$ is inputted into the adaptive filters $1_j$, the output expressed by the following equation can be obtained.

$$\hat{n}_j(n) = \sum_{m=1}^{l} h_j \cdot m(n) \cdot n'_j\{n - (m-1)\tau\}$$

On the other hand, the coefficient controller $31_{j,4}$, receiving the subtraction result $\epsilon(n)$, sequentially produces the coefficients $h_{j,m}(n)$ (m=1, ... k) so as to minimize the mean square $<\epsilon(n)>$ in accordance with an adaptive algorithm described later.

The adaptive algorithm proposed by B. Windrow et al. is called LMS (Least Mean Square) method. In this method, the coefficients $h_{j,m}(n)$, which minimize the value $<\epsilon(n)>$, are updated according to the following equation using the noise source signals $n'_j(n)$ and the subtraction result $\epsilon(n)$.

$$h_{j,m}(n+1) = h_{j,m}(n) + \mu \cdot \epsilon(n) \cdot n'_j(n) \quad (12)$$

where $\mu$ is an arbitrary fixed real number that defines the step size of the update.

Figure 11:
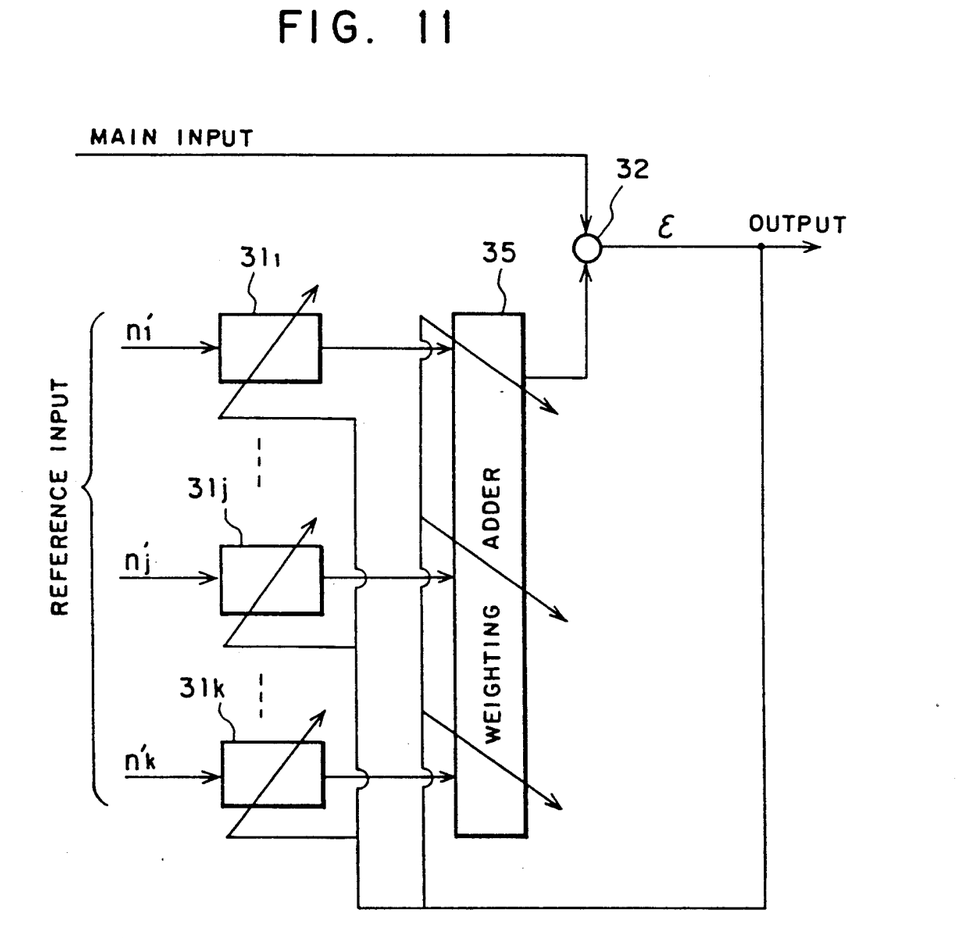
FIG. 11 is a block diagram showing another embodiment of a noise canceller according to the present invention.

Incidentally, in the above embodiment, although the outputs of the adaptive filters $31_j$ are summed up by the adder 33, a weighting adder 35 can be used in place of the adder 33 as shown in FIG. 11. In addition, weighting coefficients of the weighting adder 31 can be automatically controlled by an adaptive algorithm.

In addition, although in the above embodiment, FIR type adaptive filters are used as adaptive filters, IIR (Infinite Impulse Response) can be used. Furthermore, although the above embodiment uses the LMS method proposed by B. Widrow as the adaptive algorithm, other adaptive algorithms, such as a learning method for system identification or RLS (Recursive Least Square) method, can be used.

The invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A receiving apparatus for receiving information transmitted from a bottomhole to a surface by means of electromagnetic waves, which comprises:
   a receiving antenna for receiving a transmitted signal from said bottomhole;
   a noise detector for detecting noise current received by said receiving antenna; and
   a noise canceller for removing noise components received by said receiving antenna by comparing an output signal from said receiving antenna and an output signal of said noise detector.

2. The receiving apparatus as claimed in claim 1, wherein said receiving apparatus is applied to drilling apparatus for drilling a well which includes one or more of a casing pipe, a riser pipe and a blow out preventer and said receiving antenna includes one terminal which is electrically connected to one or more of said casing pipe, said riser pipe and said blow out preventer so as to form an electrode, and includes another terminal which is composed of an electrode buried into ground spaced a predetermined distance apart from said well.

3. The receiving apparatus as claimed in claim 1, wherein said receiving apparatus is applied to drilling apparatus for drilling a well which includes one or more of a casing pipe, a riser pipe, a drill pipe, a drilling rig having electric equipment and a ground earth line, and an electrical generator, and wherein said noise detector has a function to measure an electric current, and measures the current flowing through one or more of the casing pipe, the riser pipe, the drill pipe, the ground earth line, the electric equipment and the generator.

4. The receiving apparatus as claimed in claim 3, wherein said noise detector comprises a toroidal coil and an amplifier.

5. The receiving apparatus as claimed in claim 3, wherein said noise detector further detects a current flowing through a cable whose one end is connected to at least one of the casing pipe or the riser pipe, and whose other end is buried in the ground.

6. The receiving apparatus as claimed in claim 1, wherein said noise canceller comprises a filter for limiting frequency band of an output signal of said receiving antenna and of said noise detector, and an adjuster for adjusting an amplitude and phase of the output signal.

7. The receiving apparatus as claimed in claim 1, wherein said noise canceller comprises a plurality of analog-to-digital converters, adaptive filters and subtracters.

8. A receiving apparatus as claimed in claim 1, wherein said noise canceller is a noise canceller using parallel adaptive filters comprising:
   a plurality of adaptive filters arranged in parallel fashion;
   an adder for summing up output signals of said plurality of adaptive filters; and
   a subtracter for subtracting an output signal of said adder from a main input signal.

9. A receiving apparatus as claimed in claim 8, wherein each of said plurality of adaptive filters is an FIR type adaptive filter.

10. A receiving apparatus as claimed in claim 8, wherein each of said plurality of adaptive filters is an IIR type adaptive filter.

11. A receiving apparatus as claimed in claim 8, wherein said adder is a weighting adder.

12. A receiving apparatus as claimed in claim 8, wherein each of said plurality of adaptive filters uses as its algorithm one of a least mean square method, a learning method for system identification, and a recursive least square method.

13. The receiving apparatus as claimed in claim 1, wherein said receiving antenna is applied to drilling apparatus for drilling a well and wherein said receiving apparatus includes one terminal composed of an electrode buried into the ground near said well and another terminal which is composed of an electrode buried into the ground and spaced a predetermined distance apart from said well.

* * * * *

UNITED STATES PATENT AND TRADEMARK OFFICE
CERTIFICATE OF CORRECTION

PATENT NO. : 5,189,415
DATED : February 23, 1993
INVENTOR(S) : Takashi Shimada, et al.

It is certified that error appears in the above-identified patent and that said Letters Patent is hereby corrected as shown below:

Col. 6, line 60, "$1_{16}$" should be --$e_{16}$--.

Col. 7, line 6, "$1_{16}$" should be --$e_{16}$--.

Col. 8, line 22, (formula 11), "$+<\{n_k^{(n)-n}{}_k(n)\}^2>$" should be --$+<\{n_k(n)-\hat{n}_k(n)\}^2>$--

Col. 8, line 27, "affected" should be --affected.--.

Signed and Sealed this

Thirtieth Day of November, 1993

Attest:

BRUCE LEHMAN

*Attesting Officer*　　*Commissioner of Patents and Trademarks*